US011125962B2

(12) United States Patent
Kumar et al.

(10) Patent No.: US 11,125,962 B2
(45) Date of Patent: Sep. 21, 2021

(54) ROLLABLE OPTICAL FIBER RIBBON WITH COLOUR LINE MARKING

(71) Applicant: Sterlite Technologies Limited, Maharashtra (IN)

(72) Inventors: Sravan Kumar, Maharashtra (IN); Venkatesh Murthy, Maharashtra (IN); Kishore Sahoo, Maharashtra (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 16/262,601

(22) Filed: Jan. 30, 2019

(65) Prior Publication Data
US 2020/0183113 A1 Jun. 11, 2020

(30) Foreign Application Priority Data
Dec. 6, 2018 (IN) .............................. 201821046207

(51) Int. Cl.
*G02B 6/44* (2006.01)

(52) U.S. Cl.
CPC ............. *G02B 6/447* (2013.01); *G02B 6/443* (2013.01); *G02B 6/4435* (2013.01)

(58) Field of Classification Search
CPC ...... G02B 6/447; G02B 6/443; G02B 6/4435; G02B 6/4403; G02B 6/4407; G02B 6/4408; G02B 6/4409; G02B 6/448
See application file for complete search history.

(56) References Cited

U.S. PATENT DOCUMENTS 10,185,110 B2 * 1/2019 Kaneko .................... G02B 6/44

* cited by examiner

*Primary Examiner* — John Bedtelyon

(57) ABSTRACT

The present disclosure provides a rollable optical fiber ribbon. The rollable optical fiber ribbon includes a plurality of optical fibers positioned along a longitudinal axis of the rollable optical fiber ribbon. In addition, the rollable optical fiber ribbon includes a matrix material covering the plurality of optical fibers to provide flexibility to the rollable optical fiber ribbon. Further, the rollable optical fiber ribbon includes at least one colour line marking on the rollable optical fiber ribbon along the longitudinal axis of the rollable optical fiber ribbon.

10 Claims, 2 Drawing Sheets

ROLLABLE OPTICAL FIBER RIBBON WITH COLOUR LINE MARKING

BACKGROUND

Field of the Invention

The present disclosure relates to the field of optics and, in particular, the present disclosure relates to a rollable optical fiber ribbon with colour line marking.

Description of the Related Art

Over the last few years, optical fibers are widely used for communication to meet the increasing demands. The increasing demand of optical fibers leads to the installation of high-capacity optical fiber cables. The high capacity optical fiber cables include a large number of optical fiber ribbons inside the cable. The large number of optical fiber ribbons in the cable makes it difficult to identify or distinguish any specific optical fiber ribbon in the large number of optical fiber ribbons. Therefore, there is need of colouring optical fiber ribbon for identification or distinguishes of ribbon in a high density optical fiber ribbon cable.

There are many applications of providing colour line marking for the visual identification of rollable optical fiber ribbons in a ribbon stack. As example, but not limited to, In one of many applications of colouring optical fiber ribbon for identification or distinguishes of ribbon in a high density optical fiber ribbon cable, and because of the optical fibers are widely used for communication to meet the increasing demands, there is a need to find a fast and easy way to repair any damaged optical fiber ribbon, the present invention provide rollable optical fiber ribbon with colour marking line where we can specify easily the damaged ribbon.

BRIEF SUMMARY OF THE INVENTION

In an aspect, the present disclosure provides a rollable optical fiber ribbon. The rollable optical fiber ribbon includes a plurality of optical fibers positioned along a longitudinal axis of the rollable optical fiber ribbon. In addition, the rollable optical fiber ribbon includes a matrix material covering the plurality of optical fibers to provide flexibility to the rollable optical fiber ribbon. Further, the rollable optical fiber ribbon includes at least one colour line marking on the rollable optical fiber ribbon along the longitudinal axis of the rollable optical fiber ribbon. The colour line marking is done to provide colour-coding identification scheme for the rollable optical fiber ribbon in a plurality of rollable optical fiber ribbons. Each of the plurality of optical fibers is adjacent to other optical fiber of the plurality of optical fibers. The at least one colour line marking is provided on at least one side surface of the rollable optical fiber ribbon. The rollable optical fiber ribbon is corrugated from at least one side to enable the rolling of the rollable optical fiber ribbon in circular fashion. The matrix material is made of curable UV acrylate. The at least one colour line marking is provided on at least one side surface of the rollable optical fiber ribbon. The rollable optical fiber ribbon is corrugated from a first side and a second side to enable rolling of the rollable optical fiber ribbon in clockwise direction and in anti-clockwise direction.

A primary object of the present disclosure is to provide a flexible and rollable optical fiber ribbon.

Another object of the present disclosure is to provide a rollable optical fiber ribbon with colour line marking.

Yet another object of the present disclosure is to provide colouring scheme for the rollable optical fiber ribbons.

Yet another object of the present disclosure is to provide colour line marking for the visual identification of rollable optical fiber ribbons in a ribbon stack.

Yet another object of the present disclosure is to provide the colour line marking on individual rollable optical fiber ribbon in a ribbon stack as per the colour code.

Yet another object of the present disclosure is to provide the rollable optical fiber ribbon having two side corrugations.

In an embodiment of the present disclosure, the matrix material is made of curable UV acrylate.

In an embodiment of the present disclosure, the rollable optical fiber ribbon is corrugated from at least one side to enable the rolling of the rollable optical fiber ribbon in circular fashion.

In an embodiment of the present disclosure, the at least one side surface of the rollable optical fiber ribbon corresponds to a first side surface, second side surface, third side surface and fourth side surface.

In an embodiment of the present disclosure, the at least one colour line marking on the rollable optical fiber ribbon facilitates in visually distinguishing the rollable optical fiber ribbon in the plurality of rollable optical fiber ribbons. The colour line marking on the plurality of rollable optical fiber ribbons is formed of different colour as per the colour code.

DESCRIPTION OF THE DRAWINGS

Figure 1:
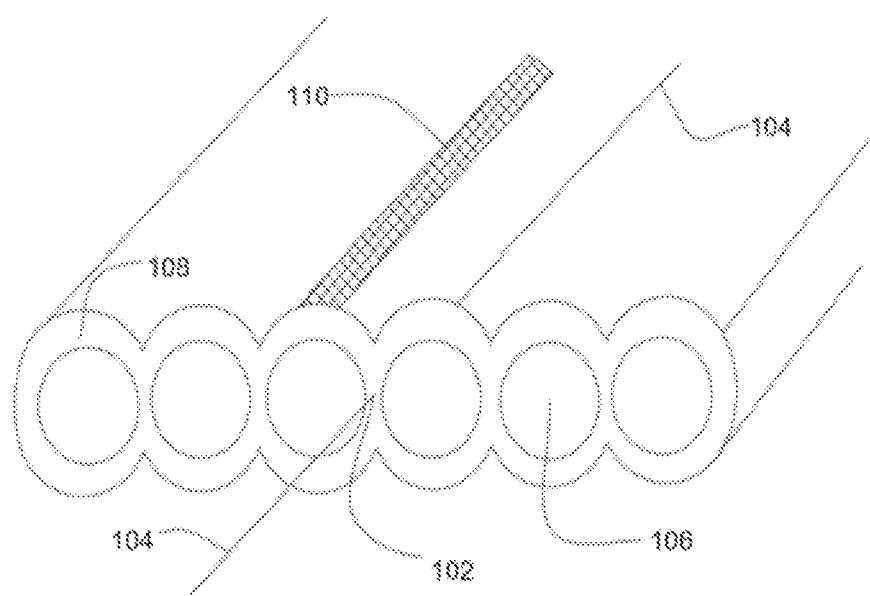
Figure 2:
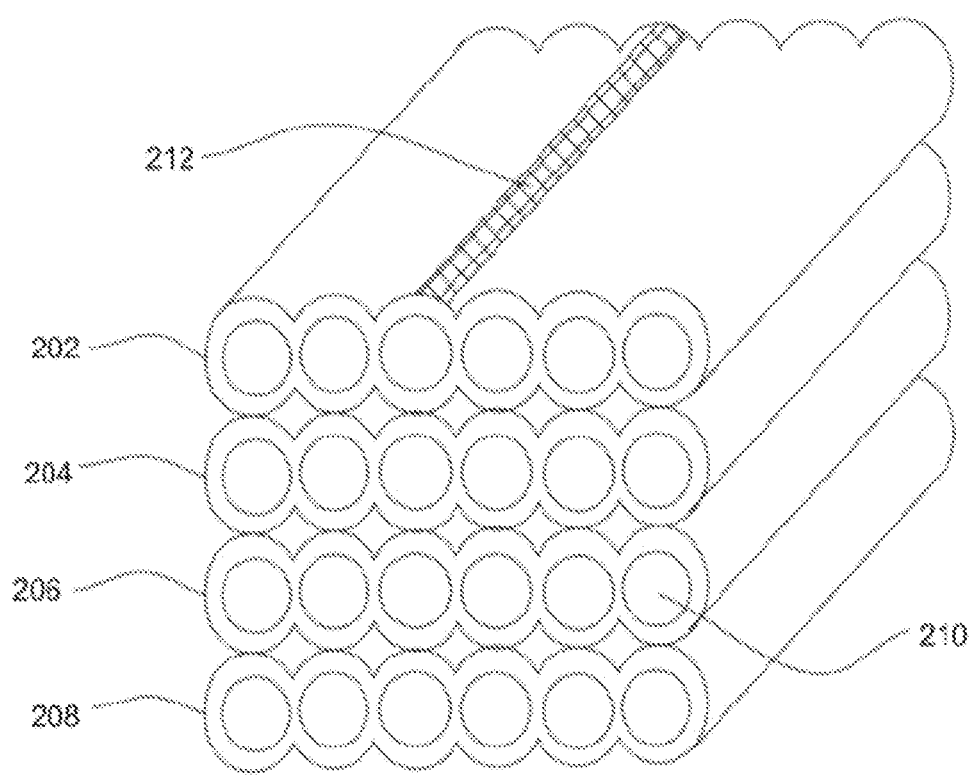

Having thus described the disclosure in general terms, reference will now be made to the accompanying figures, wherein:

FIG. 1 illustrates a cross sectional view of a rollable optical fiber ribbon with colour line marking, in accordance with an embodiment of the present disclosure; and FIG. 2 illustrates a cross sectional view of the rollable optical fiber ribbon stack with colour line marking, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. The rollable optical fiber ribbon.
102. The geometrical centre.
104. Longitudinal axis.
106. A plurality of optical fibers.
108. A matrix material.
110. The colour line marking.
200. The rollable optical fiber ribbon stack.
202. Rollable optical fiber ribbon.
204. Rollable optical fiber ribbon.
206. Rollable optical fiber ribbon.
208. Rollable optical fiber ribbon.
202-208. A plurality of rollable optical fiber ribbons.
210. plurality of optical fibers.
212. A colour line marking.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross sectional view of a rollable optical fiber ribbon 100, in accordance with an embodiment of the present disclosure. The rollable optical fiber ribbon 100 is a type of optical fiber ribbon which facilitates in increasing optical fiber density of a cable. The rollable optical fiber ribbon 100 is defined by a longitudinal axis 104 passing through a geometrical centre 102. In general, the longitudinal axis is an imaginary axis along the lengthwise direction of the figure or body, usually passing through its center of gravity or geometrical center. In addition, the geometrical centre 102 can be defined as the midpoint of the rollable optical fiber ribbon 100.

The rollable optical fiber ribbon 100 includes a plurality of optical fibers 106. In addition, each of the plurality of optical fibers 106 is placed adjacent to another optical fiber of the plurality of optical fibers 106. In an embodiment of the present disclosure, each of the plurality of optical fibers 106 is along the longitudinal axis 104 of the rollable optical fiber ribbon 100. In an embodiment of the present disclosure, each of the plurality of optical fibers 106 is parallel to other optical fibers of the plurality of optical fibers 106. In general, the optical fiber is a fiber used for transmitting information as light pulses from one end to another. In addition, the optical fiber is a thin strand of glass or plastic capable of transmitting optical signals. Further, the optical fiber is configured to transmit large amount of information over long distances. Furthermore, the optical fiber includes a core region and a cladding region. The core region is an inner part of the optical fiber and the cladding section is an outer part of the optical fiber. The cladding region surrounds the core region. Moreover, the core region and the cladding region are formed during the manufacturing stage of the optical fiber. The core region has a refractive index which is greater than a refractive index of the cladding region. In an embodiment of the present disclosure, the core region has a higher refractive index than the cladding region to transmit information from one end to another end. In an embodiment of the present disclosure, the optical fiber is a single mode optical fiber. In another embodiment of the present disclosure, the optical fiber is a multimode optical fiber.

The rollable optical fiber ribbon 100 includes the plurality of optical fibers. The rollable optical fiber ribbon 100 is a coated optical fiber placed side by side. The coating covers the plurality of optical fibers 106. The coating is made of a matrix material 108. In an embodiment of the present disclosure, the rollable optical fiber ribbon helps in mass fusion splicing. In addition, a plurality of rollable optical fiber ribbons occupies less space inside the optical fiber ribbon cable.

In an embodiment of the present disclosure, the rollable optical fiber ribbon 100 is a flexible optical fiber ribbon. The flexibility is imparted in the rollable optical fiber ribbon 100 due to the use of the matrix material 108. The matrix material 108 refers to a material with which the rollable optical fiber ribbon 100 is manufactured. In addition, the rollable optical fiber ribbon 100 is a corrugated optical fiber ribbon. The rollable optical fiber ribbon 100 is corrugated from at least one side. In an embodiment of the present disclosure, the corrugation is done on both sides (first side and second side) of the rollable optical fiber ribbon 100. In an embodiment of the present disclosure, the first side is a top side and the second side is a bottom side of the rollable optical fiber ribbon 100 (as shown in FIG. 1). In another embodiment of the present disclosure, the first side is the left side and the second side is the right side of the rollable optical fiber ribbon 100. In another embodiment of the present disclosure, the corrugation is on any one side (first side or second side) of the rollable optical fiber ribbon 100 and the other side of rollable optical fiber ribbon is flat. In general, the corrugation is defined as the grooving or folds on the surface of the rollable optical fiber ribbon 100. The corrugation enables the rollable optical fiber ribbon 100 to roll in a circular fashion. The rolling of the optical fiber ribbon allows it to consume less space when positioned inside a buffer tube. In an embodiment of the present disclosure, the corrugation on both sides of the rollable optical fiber ribbon 100 allows it to roll in a circular fashion from any of the two sides of the rollable optical fiber ribbon 100. In another embodiment of the present disclosure, the corrugation is on any one side of the rollable optical fiber ribbon and the other side is flat which allow it to roll only from the side which is grooved or corrugated.

The rollable optical fiber ribbon 100 is made of the matrix material 108. The matrix material 108 imparts flexibility to the rollable optical fiber ribbon 100. The flexibility of the rollable optical fiber ribbon 100 enables it to roll easily. Further, flexibility is the property of the material with which the rollable optical fiber ribbon 100 is made. Flexibility may be referred to the ability of any material to undergo bending without any cracks or other failures when an external force is applied to it. In an embodiment of the present disclosure, the matrix material 108 is a curable UV acrylate. The matrix material 108 curable UV acrylate is a special kind of material having pre-defined flexibility. The matrix material 108 brings flexibility to the rollable optical fiber ribbon 100. In an embodiment of the present disclosure, the curable UV acrylate has predefined properties. The curable UV acrylate is soft material having high elongation along with fast cure speed. The fast cure speed of the curable UV acrylate leads to improvement in the productivity of the rollable optical fiber ribbon 100. The cured film exhibits excellent film stability. In an embodiment of the present disclosure, the matrix material 108 has glass transition temperature of about −18 degree Celsius at 1000 Mega Pascal. In an embodiment of the present disclosure, the matrix material 108 has glass transition temperature of about −28 degree Celsius at 100 Mega Pascal. In an embodiment of the present disclosure, the matrix material has secant modulus of about 49 Mega Pascal at 2.5% strain. In an embodiment of the present disclosure, the matrix material has tensile strength of about 15 Mega Pascal. In general, the glass transition is the gradual and reversible transition in amorphous materials, from a hard and relatively brittle "glassy" state into a viscous or rubbery state as the temperature is increased. In general, the secant modulus is the slope of a line drawn from the origin of the stress-strain diagram and intersecting the curve at the point of interest. In addition, the secant modulus describes the stiffness of the matrix material in the inelastic region of the stress strain diagram. In general, the tensile strength is defined as resistance of a material to breaking under tension.

The rollable optical fiber ribbon 100 is colour marked with a colouring technique for the easy identification of the rollable optical fiber ribbon 100 in a plurality of rollable optical fiber ribbons. In addition, at least one colour line marking 110 is done on the rollable optical fiber ribbon 100 to provide colour coding identification scheme for the rollable optical fiber ribbon 100 in a plurality of optical fiber ribbons. Further, the colour line marking 110 is done along the longitudinal axis 104 of the rollable optical fiber ribbon 100. In general, the colour line marking is a marking in the form of line on surface of any side of the rollable optical fiber ribbon 100 with any colour according to the colour code used for the optical fiber ribbons. In addition, the colour line marking 110 is the marking of line of a specific width on the surface of any side of the rollable optical fiber ribbon 100.

In an example, the colour used for the marking of the rollable optical fiber ribbon 100 is selected from a group. The group consists of blue, orange, green, brown, slate, white, red, black, yellow, violet, rose, and aqua colour. The colour line marking 110 is done on at least one side surface of the rollable optical fiber ribbon 100. The at least one side surface includes a first side surface, a second side surface, a third side surface and a fourth side surface. In an embodiment of the present disclosure, the first side surface represents the top side surface of the rollable optical fiber ribbon, the second side surface represents the bottom side surface of the rollable optical fiber ribbon. In an embodiment of the present disclosure, the third side surface represents the left side surface of the rollable optical fiber ribbon and the fourth side surface represent the right side of the rollable optical fiber ribbon. In an embodiment of the present disclosure, the colour line marking 110 is done on the first side surface or second side surface of the rollable optical fiber ribbon 100. In another embodiment of the present disclosure, the colour line marking 110 is done on the third side surface or fourth side surface of the rollable optical fiber ribbon 100. In yet another embodiment of the present disclosure, the colour line marking 110 is done on the first side surface and the second side surface of the rollable optical fiber ribbon 100. In yet another embodiment of the present disclosure, the colour line marking 110 is done on the third side surface and the fourth side surface of the rollable optical fiber ribbon 100.

The colour line marking 110 provides visual identification of the rollable optical fiber ribbon in a stack of the plurality of rollable optical fiber ribbons. In addition, visual identification of the rollable optical fiber ribbon in the stack of the plurality of rollable optical fiber ribbons makes it easy to differentiate individual rollable optical fiber ribbon in the ribbon stack.

FIG. 2 illustrates a cross sectional view of an example of the rollable optical fiber ribbon stack 200. The rollable optical fiber ribbon stack 200 includes a plurality of rollable optical fiber ribbons 202-208. The plurality of rollable optical fiber ribbons 202-208 is arranged into a bundle with a matrix structure to form the rollable optical fiber ribbon stack 200. In other words, the rollable optical fiber ribbon stack 200 is stack of the plurality of rollable optical fiber ribbons 202-208. Each of the plurality of rollable optical fiber ribbons 202-208 is a rollable optical fiber ribbon (explained in FIG. 1). In addition, each rollable optical fiber ribbon of the plurality of rollable optical fiber ribbons 202-208 includes a plurality of optical fibers 210. Further, a colour line marking 212 of different colour is done on each of the plurality of rollable optical fiber ribbons 202-208.

In an example, the colour used for the colour line marking 212 of the rollable optical fiber ribbon 202 is different from the colour used for the colour line marking 212 of the other rollable optical fiber ribbons 204-208. In an embodiment of the present disclosure, the selection of colour for the colour line marking 212 on the plurality of rollable optical fiber ribbons 202-208 is based on the colour coding of the ribbons. Furthermore, the colour line marking 212 is done on the plurality of rollable optical fiber ribbons 202-208 to differentiate each rollable optical fiber ribbon in the rollable optical fiber ribbon stack 200. Also, the colour line marking 212 is done on at least one side of each of the plurality of rollable optical fiber ribbons 202-208. In an embodiment of the present disclosure, the colour line marking 212 is done on first side surface or second side surface of each of the plurality of rollable optical fiber ribbons 202-208. In another embodiment of the present disclosure, the colour line marking 212 is done on the left side surface or right side surface of each of the plurality of rollable optical fiber ribbons 202-208. In yet another embodiment of the present disclosure, the colour line marking 212 is done on any suitable side of each of the plurality of rollable optical fiber ribbons 202-208. Also, the colour line marking 212 on each of the plurality of rollable optical fiber ribbons 202-208 facilitates the visual identification or differentiation of rollable optical fiber ribbon in the rollable optical fiber ribbon stack 200.

Going further, the present disclosure provides numerous advantages over the prior art. The present disclosure provides the easy identification of each of the plurality of rollable optical fiber ribbons in the rollable optical fiber ribbon stack with the help of colour line marking on individual ribbons. In addition, the colour line marking facilitates the identification of individual ribbon with the increase in number of rollable optical fiber ribbons in the optical fiber ribbon cable.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What we claim is:

1. An optical fiber ribbon comprising:
   a plurality of optical fibers positioned along a longitudinal axis of the optical fiber ribbon, wherein the plurality of optical fibers are arranged in parallel to other optical fibers in the optical fiber ribbon; and
   at least one colour line marking on the optical fiber ribbon, wherein the at least one colour line marking is a continuous straight line extending from a first end of the optical fiber ribbon to a second end of the optical fiber ribbon along an entire length of the optical fiber ribbon, parallel to the longitudinal axis of the optical fiber ribbon,
   wherein the optical fiber ribbon is made of a matrix material to provide flexibility to the optical fiber ribbon and wherein the at least one colour line marking is on the matrix material.

2. The optical fiber ribbon as claimed in claim 1, wherein the optical fiber ribbon is a rollable optical fiber ribbon.

3. The optical fiber ribbon as claimed in claim 1, wherein the at least one colour line marking is a marking of a line of a constant width.

4. The optical fiber ribbon as claimed in claim 1, wherein the at least one colour line marking is provided on at least one side surface of the optical fiber ribbon.

5. The optical fiber ribbon as claimed in claim 1, wherein a plurality of the optical fiber ribbons is arranged into a bundle with a matrix structure to form an optical fiber ribbon stack.

6. The optical fiber ribbon as claimed in claim 5, wherein the at least one colour line marking on the optical fiber ribbon facilitates in visually distinguishing the optical fiber ribbon in the plurality of optical fiber ribbons.

7. The optical fiber ribbon as claimed in claim 1, wherein the at least one colour line marking on each of the rollable optical fiber ribbons is formed of different colour.

8. The optical fiber ribbon as claimed in claim 1, wherein the matrix material is made of curable UV acrylate.

9. The optical fiber ribbon as claimed in claim 1, wherein at least one side surface of the optical fiber ribbon corresponds to a first side surface, a second side surface, a third side surface and a fourth side surface.

10. The optical fiber ribbon as claimed in claim 1, wherein at least one side of the optical fiber ribbon comprises a first side and a second side, wherein corrugation on the first side and the second side enable rolling of the optical fiber ribbon in a clockwise direction and in an anti-clockwise direction respectively.

* * * * *